United States Patent [19]

Armbruster

[11] Patent Number: 4,711,159
[45] Date of Patent: Dec. 8, 1987

[54] BUILT-IN VEHICLE AIR FILTRATION SYSTEM

[76] Inventor: Joseph M. Armbruster, 2700 NE. 47th St., Lighthouse Point, Fla. 33064

[21] Appl. No.: 910,636

[22] Filed: Sep. 23, 1986

[51] Int. Cl.$^4$ .............................................. B60H 3/06
[52] U.S. Cl. ...................................... 98/2.11; 98/2.14
[58] Field of Search ................ 98/2, 2.11, 2.14, 2.15

[56] References Cited

U.S. PATENT DOCUMENTS

| 1,778,546 | 10/1930 | Bode | 98/2.15 |
| 2,722,106 | 11/1955 | Henney | 98/2.11 X |
| 4,007,875 | 2/1977 | Stolz | 98/2.11 X |
| 4,022,599 | 5/1977 | Wilson et al. | 98/2.11 X |
| 4,252,053 | 2/1981 | Muto et al. | 98/2.15 |
| 4,376,408 | 3/1983 | Iijima et al. | 98/2.11 X |
| 4,401,013 | 8/1983 | Ohashi et al. | 98/2.11 |

FOREIGN PATENT DOCUMENTS 2803624 8/1974 Fed. Rep. of Germany ....... 98/2.15

*Primary Examiner*—Harold Joyce
*Attorney, Agent, or Firm*—Fleit, Jacobson, Cohn & Price

[57] ABSTRACT

An air filtration and purifying system for the air interiorly of a vehicle and is in the form of a built-in device for vehicles for removing with or without an air conditioning system or heating system but preferably with an air conditioning system or heating system and effectively removed airborne particulates such as dust, dirt, pollen and the like, odors such as tobacco, smoke, food, body odors and toxic gases and fumes such as carbon monoxide, tetraethyl lead and the like. Basically, the built-in system includes a housing mounted under or inwardly of the dashboard with a fan associated therewith and forming an air chamber located immediately inwardly of a first stage foam filter and a second stage filter of activated carbon or other material with the air being drawn into the air chamber with clean air then being discharged from the housing by the fan in order to discharge clean air throughout the interior of a vehicle for enhancing the health and comfort of the vehicle occupants. An air intake on the headliner and ducts in the side pillar and rocker panel provide air circulation throughout the interior of the vehicle.

14 Claims, 10 Drawing Figures

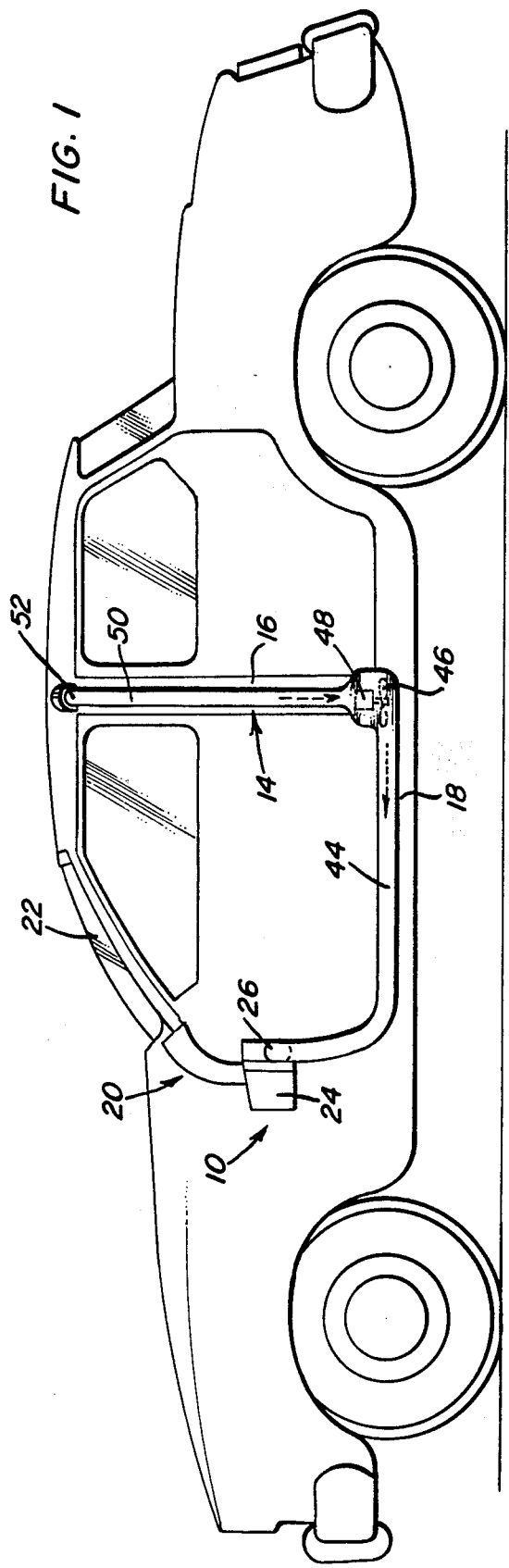
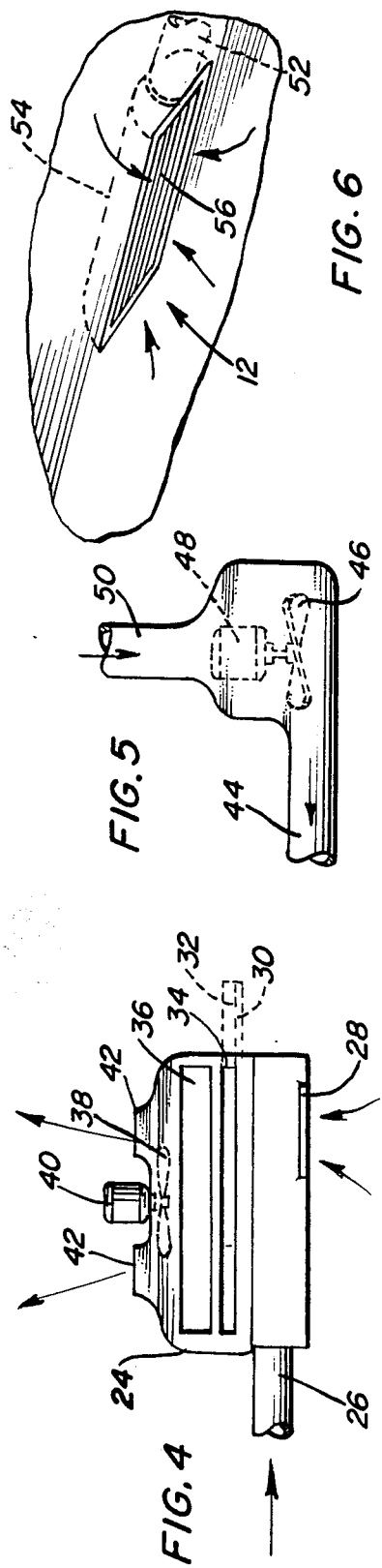

BUILT-IN VEHICLE AIR FILTRATION SYSTEM

BACKGROUND OF THE INVENTION

1. Field of the Invention

The present invention relates to an air filtration and purifying system for the air interiorly of a vehicle and is in the form of a built-in device for vehicles for removing particulate material and odors as well as toxic gases and fumes. The built-in system may be used in vehicles with or without an air conditioning system or heating system but preferably with an air conditioning system or heating system and effectively removes airborne particulates such as dust, dirt, pollen and the like and also removes odors such as tobacco, smoke, food, body odors and also removes toxic gases and fumes such as carbon monoxide, tetraethyl lead and the like. Basically, the built-in system includes a housing mounted under or inwardly of the dashboard with a fan associated therewith and forming an air chamber located immediately inwardly of a foam filter and activated carbon filter with air being drawn into the air chamber with clean air then being discharged from the housing by the fan in order to discharge clean air throughout the interior of a vehicle. An air intake in the headliner and ducts in the side pillar, rocker panel and cowl route contaminated air into a filter where the air is cleaned with the clean air passing to the air conditioner coil or heater core and then circulated throughout the cabin or interior of the vehicle.

2. Information Disclosure Statement

May prior U.S. Pat. No. 4,514,197 issued Apr. 30, 1985 discloses a filter associated with an air circulator in which the filter includes a foam component and a carbon component. Also, various types of vehicles including passenger automobiles include optional heating and air conditioning systems in which vehicle interior air can be recirculated and conditioned by either heating or cooling and discharged back into the passenger compartment. However, there is no built-in vehicle air filtration system that is mounted interiorly of an automotive vehicle for circulating interior air through a foam filter and carbon filter and discharging it back into the interior of the vehicle.

SUMMARY OF THE INVENTION

An object of the present invention is provide a built-in vehicle air filtration system comprising a housing mounted under the dashboard and including an air inlet means and air outlet means, air circulating fan means and a foam filter and a charcoal filter in the inlet means by which air can be drawn through the filters into an interior air chamber and discharged from the air outlet means for dispersion substantially throughout an enclosed area of a vehicle.

Another object of the invention is to provide a vehicle air filtration system in accordance with the preceding object in which the housing is mounted under the dashboard, against the fire wall or any other suitable location in which the air inlet means is connected with duct work extending under the dashboard, along the cowling and downwardly and rearwardly along the inner surface of the rocker panel and upwardly through the side pillar and inwardly to an air inlet located generally centrally in the headliner with the housing also including an omnidirectional air inlet so that air is supplied to the air chamber from the center top of the cabin and also from the front and rear area of the front and rear seat compartments of the vehicle.

A further object of the invention is to provide an air filtration and purifying system in accordance with the preceding object in which the air outlet means includes discharge ducts associated with outlets at the base of the windshield and outlets in the dashboard for dispersion of conditioned air throughout the interior of the vehicle with the housing also including an evaporator coil, heating coil and the like so that the temperature and humidity conditions of the recirculated air can be controlled.

A still further object of the invention is to provide a built-in vehicle air filtration and purifying system in which the duct work extending from the headliner air intake is provided with a fan at the juncture between the duct in the side pillar and rocker panel to facilitate air circulation.

Yet a further object of the invention is to provide a vehicle air filtration and purifying system including an inlet at the center top of the interior of an occupant area of a vehicle, an inlet at several additional locations interiorly of the occupant area, a fresh air inlet and a duct system for recirculating interior air or blending outside fresh air and supplying it to an air filtering, purifying and conditioning assembly with discharge ducts and outlets associated with various portions of the interior of the occupant area of the vehicle including outlets oriented longitudinally at the upper portion of one side of the occupant area in order to provide a complete circulation and dispersion of filtered, purified and conditioned air throughout the occupant area of the vehicle.

Still another object of the invention is to provide a built-in air circulating and purifying device for automotive vehicles or similar vehicles having an enclosed space occupied by a vehicle operator and/or passengers for effectively recirculating interior air, blending fresh outside air, removing particulate material and purifying the air by removing odors, toxic gases and fumes and the like and discharging the clean air back into the enclosed space or compartment in order to enhance the comfort of the occupants of the enclosed space.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a side elevational view of a vehicle with the built-in air filtration system of the present invention incorporated therein.

FIG. 4 is a top plan view of the housing illustrating the air inlet from the ducts and the air inlet from the forward portion of the front seat compartment of the vehicle, the circulating fan and discharge ducts.

FIG. 5 is a fragmental view illustrating the circulating fan oriented in the juncture between the side pillar duct and the rocker panel duct.

FIG. 6 is a fragmental perspective view of the headliner air intake.

DESCRIPTION OF THE PREFERRED EMBODIMENT

Figure 2:
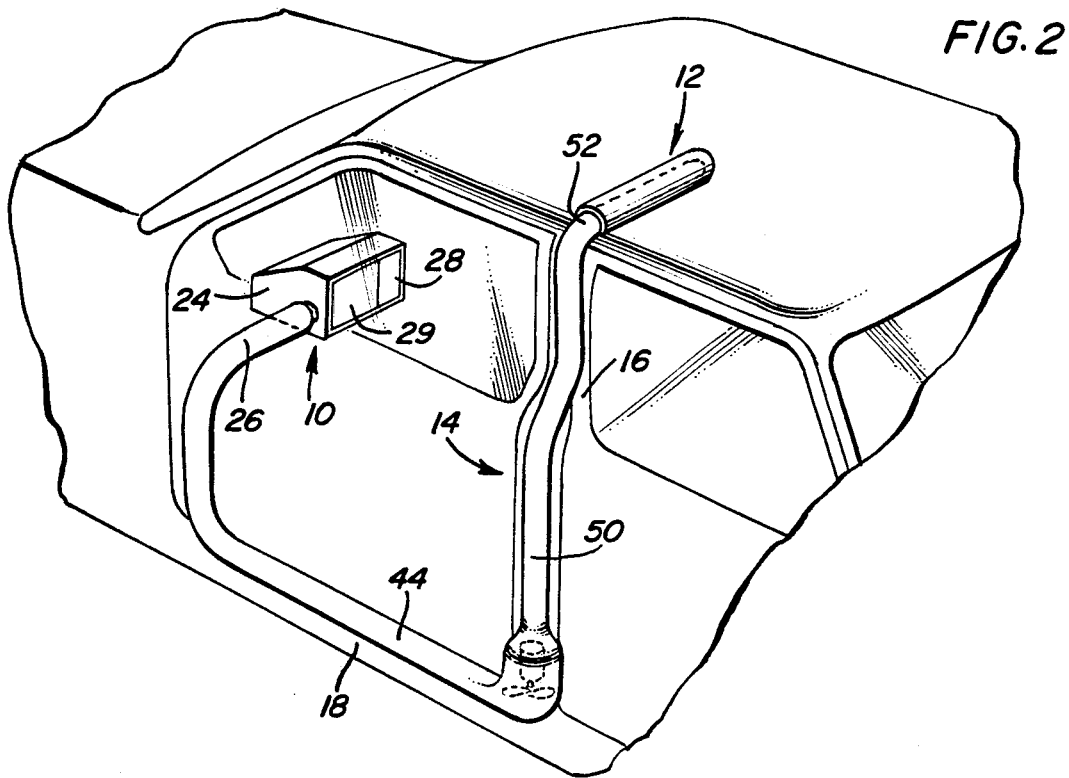
FIG. 2 is a schematic perspective view of a portion of the vehicle illustrating the association of the components of the air filtration system.
Figure 3:
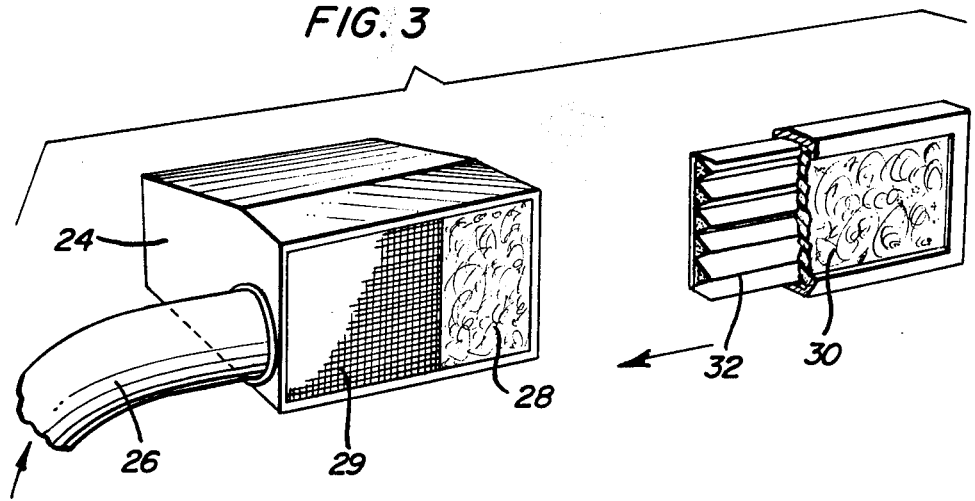
FIG. 3 is an exploded group perspective view illustrating the slidable insertion of the foam plastic and charcoal filters associated with the housing.

Referring now specifically to the drawings, the built-in air filtration system of the present invention includes an underdash mounted unit 10, a headliner mounted air intake 12, a duct system 14 which extends from the headliner intake 12 to the underdash unit 10 with the unit 10 including the filtering and purifying assembly and discharging cleaned air back into the interior of the vehicle. The vehicle illustrated is typical of present day vehicle structures and includes a side pillar or post 16, a rocker panel 18 extending along the bottom of the vehicle under the doorsill all of which are of hollow construction capable of receiving the ducts 14. The unit 10 is mounted in any suitable manner depending upon the particular vehicle structure with which it is associated and is supported from the fire wall or otherwise supported and is communicated with the duct 14 and includes a discharge assembly 20 that discharges through the defroster slots at the base of the windshield 22 and may also be connected with other conditioned air discharge openings in the dashboard or wherever else located in the vehicle. With the built-in structure, the headliner air inlet 12 is hardly discernible and the remainder of the structure is concealed or substantially so.

The unit 10 includes a housing which may be of generally rectangular configuration and is designated by the numeral 24 with the housing including an air inlet duct 26 at one side thereof which connects with the duct 14 to provide intake of contaminated air from the interior of the vehicle. Also, the housing 14 include an air inlet 28 in the front wall 29 thereof so that a portion of the air coming into the housing 24 will be taken from the front seat compartment to enhance air circulation throughout the interior of the vehicle. The interior of the housing 24 defines an air chamber with a first stage foam plastic filter 30 and a second stage activated carbon filter 32 inserted therein which filters may be a single assembly and inserted through a slot 34 in the sidewall of the housing 24. The filters 30 and 32 are disclosed in more detail in may aforementioned U.S. Pat. No. 4,514,197 in which the carbon filter 32 is provided with alternate ridges and valleys. Inwardly of the filters 30 and 32, the housing 24 is provided with an evaporator coil 36 connected with the air conditioning system of the vehicle so that the air circulating through the housing will be cleaned and also conditioned. The housing 24 may also include a heating coil for heating the air when desired and a circulating fan 38 is provided within the housing 24 which is driven by a motor 40 and the housing including outlets 42 connected with ducts 20 which extend to the slots at the base of the windshield and also extend to louvered outlets or the like in the dashboard to provide optional points of discharge of the cleaned and conditioned air.

The duct 26 which extends into and communicates with the air chamber within the housing 24 extends laterally and extends downwardly interiorly of the sidewall of the forward portion of the vehicle and extends into a horizontal duct 44 that extends throughout the length of the interior of the rocker panel 18 with a fan 46 and motor 48 being located at the junction between the horizontal duct 44 and a vertical duct 50 which is oriented in the side pillar 16 with the upper end of the duct 50 extending inwardly at 52 between the roof and the headliner for connection with the headliner air inlet 12. The headliner air inlet 12 includes a hollow housing 54 oriented between the headliner and roof with an inlet opening and grill 56 facing downwardly and the duct 52 extending from one end thereof laterally to the pillar duct 50.

All of the ducts are hidden from view as is the fan 46 and motor 48 which can be provided with suitable control with only the headliner air intake or return grill being visible. The air inlet 28 in the housing 24 is sized so that approximately one-third of the intake air passes inwardly through the inlet 28 and two-thirds passes inwardly through the headliner intake 12. The evaporator coil, fan and motor and control baffles, valves and the like for air discharge are conventional in of themselves with the addition of the two-stage foam plastic filter and carbon filter in front of the evaporator or heating coil and the particular air inlet 28 and the return air duct 26 and the association of the ducts and headliner intake with the vehicle are unique and novel and provides air circulation which is not only conditioned but is cleaned by removing particulate material in the first stage foam plastic filter and removing odors, toxic gases and fumes and other impurities in the second stage activated carbon filter so that cleaned and purified conditioned air is discharged from the housing 24 through ducts that optionally communicate with defrost slots at the base of the windshield and louvered outlets in the dashboard or in other locations as conventionally utilized in automobiles. The air intake arrangement is novel with a portion of the air being taken directly into the housing from the front of the front seat compartment and the major portion of the intake air being taken inwardly at the center of the headliner through the headliner inlet 12 thus producing effective air circulation and effective air cleaning and purification in the interior of the vehicle.

The first stage foam filter is flexible and can be easily removed, washed and replaced. Conventional hand soap, liquid detergent and running water can be used to rinse the foam filter. The second stage filter of activated charcoal or other material can be easily removed but must be replaced with a new filter as it cannot be washed. The second stage filter will have an effective life of from two to six months or longer depending upon exposure. The loss of effectiveness of the second stage shelter will be noted when odors can be detected when in operation.

The removal of airborne particulates, odors and toxic gases and fumes that adversely affect allergy and respiratory sufferers will greatly enhance the health and comfort of the vehicle occupants as they will breathe purified air from which irritants have been removed.

The unit may be permitted to run for several minutes after the ignition switch has been turned off by using a timer device which enables lingering contaminants to be removed from the air in the vehicle so that when occupants again enter the vehicle, the air will be fresh, clean and conditioned.

Figure 8:
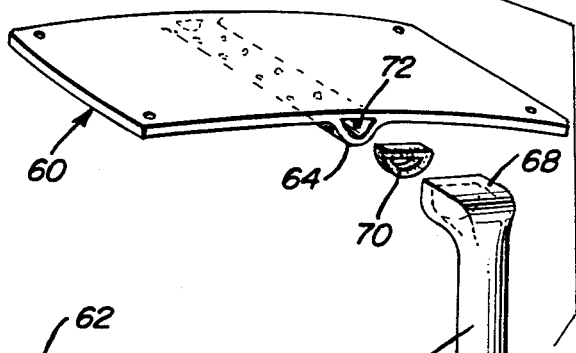
FIG. 8 is an exploded group perspective view of the snap-in headliner, pillar duct and connecting gasket arrangement.
Figure 7:
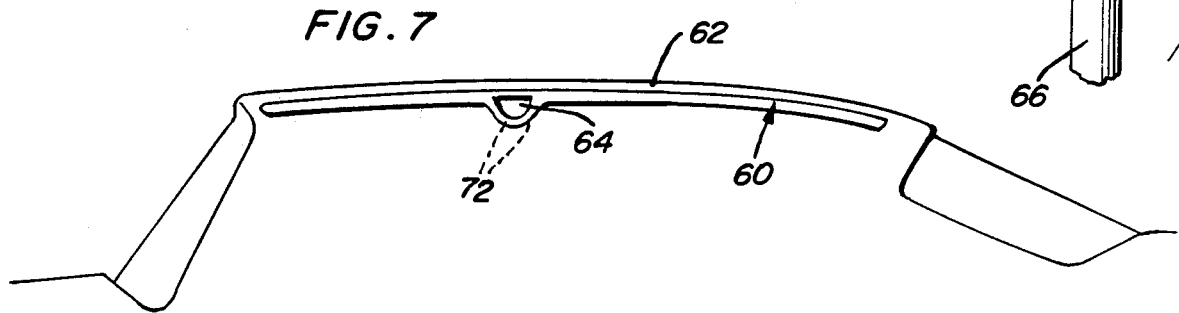
FIG. 7 is a schematic side elevational view illustrating a snap-in headliner with a duct and inlet incorporated therein.

FIGS. 7 and 8 illustrate schematically a variation of the present invention which includes a headliner generally designated by numeral 60 which is secured to the vehicle roof 62 or otherwise secured in place by any suitable manner with the air inlet duct 64 being molded into the headliner 60 which is also a molded component with the inlet duct 64 extending transversely to any extent desired with one end thereof being connected to a pillar duct 66 having a lateral upper end 68 that is sealingly connected and communicated with the molded duct 64 by a flexible gasket 70 which may be in the form of a flexible rubber seal interposed between the end of the laterally extending portion 68 of the duct 66 and the duct 64 with any suitable means mechanically connecting the components in sealed relation and so that vibrations will not be transmitted therebetween but with air being passed therebetween with the air being capable of entering the duct 64 through a plurality of small orifices 72 with the remainder of the structure operating in the same manner as that disclosed in FIGS. 1-6. This structure indicates that the inlet and intake duct in the center top of the occupant area need not be a separate duct but can be formed directly into the headliner without producing any substantial protrusion into the occupant area.

Figure 9:
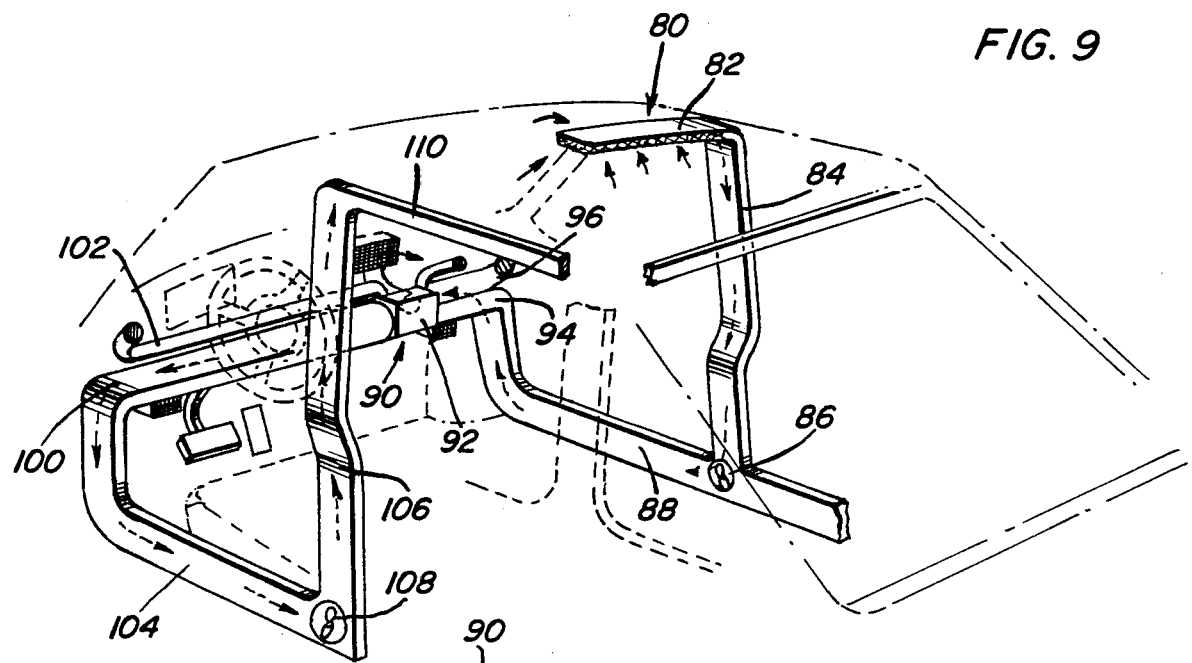
FIG. 9 is a schematic perspective view of another embodiment of the vehicle air filtration and purifying system of the present invention.
Figure 10:
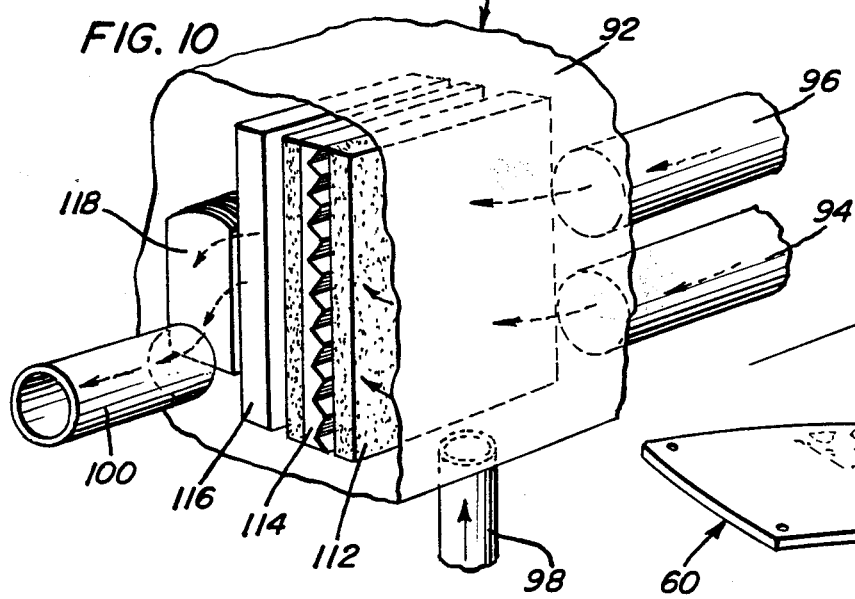
FIG. 10 is a schematic perspective view illustrating the duct work associated with the air filtration, purifying and conditioning assembly.

FIGS. 9 and 10 disclose schematically another embodiment of the present invention generally designated by reference numeral 80 which includes an air inlet 82 in the top area of the occupant space communicated with a pillar duct 84 in one sidewall portion of the vehicle. The return air inlet 82 may be molded into the headliner, snapped in or incorporated into the headliner area in any suitable manner with the inlet being connected to the pillar duct through a flexible air seal or any other suitable manner with a air booster fan 86 being incorporated into the lower end of the duct 84 where it joins with a rocker panel duct 88 which ultimately communicates with a filtering, purifying and air conditioning assembly 90 located in the area between the dashboard and firewall with the assembly 90 including a housing 92 having a duct 94 communicated therewith. The duct 94 is communicated with the rocker panel duct 88 and is positioned alongside a duct 96 which extends to a source of fresh air from outside the vehicle such as a cowl vent. Also, the housing 92 includes an inlet duct 98 directed toward the floor area of the vehicle so that incoming air is obtained from throughout the occupant area and from the ambient atmosphere for mixing and blending together in the filtering, purifying and air conditioning assembly 90. Air is discharged from the assembly 90 through a duct 100 which includes branches 102 located at different locations along the dashboard and under the dashboard with the duct 100 being communicated with a rocker panel duct 104 along the side of the vehicle opposite to the duct 88 with the clean, purified and conditioned air passing through and up through a side pillar duct 106 with a booster fan 108 in the juncture for discharge of cleaned air along a duct 110 which extends longitudinally along the side of the occupant area for discharging air throughout the area of the space occupied by the vehicle occupants.

Positioned in the assembly 90 is the first stage foam filter 112 which is easily removable from a side or bottom access opening together with a second stage charcoal filter or the like 114 which can be likewise removed. An evaporator core 116 along with an evaporator blower or fan assembly 118 is also provided in the housing 92 for circulating air from the inlet ducts 94 and 96 through the filters 112 and 114 and through the evaporator core or heater core when the fan and fan motor assembly 118 are operating for discharge of cleaned, filtered and purified air at a desired temperature being discharged through the duct 100 and various branch ducts connected therewith. In this arrangement, fresh air from the outside of the vehicle is filtered, purified and conditioned before being circulated into the vehicle thereby providing temperature blend or simply additional air supply which will be cleansed of impurities before it is circulated into the occupant area of the vehicle.

These together with other objects and advantages which will become subsequently apparent reside in the details of construction and operation as more fully hereinafter described and claimed, reference being had to the accompanying drawings forming a part hereof, wherein like numerals refer to like parts throughout.

What is claimed as new is as follows:

1. An air filtration and purification system for the interior of a vehicle comprising an air intake adjacent the center portion of the headliner of a vehicle, an air duct extending downwardly within the side pillar of the vehicle and forwardly within the rocker panel of the vehicle, a housing located under the dashboard of the vehicle with the duct connected thereto, said housing including a foam plastic filter and carbon filter through which air passes, a heat exchange coil inwardly of the filters through which air passes, fan means circulating air through the housing, and discharge means from the housing for discharging air into the interior of the vehicle after the air has been cleaned and purified by passing through the filters and conditioned by passing through the heat exchange coil.

2. The structure as defined in claim 1 wherein said headliner air intake includes a hollow casing mounted above the headliner and including an inlet grill substantially flush with the headliner, one end of the casing including a laterally extending duct extending between the headliner and roof and being connected to the duct in the side pillar of the vehicle.

3. The structure as defined in claim 2 wherein the juncture between the side pillar duct and the rocker panel duct includes a fan to move air through the ducts to the housing.

4. The structure as defined in claim 3 wherein said housing includes an inlet in a forward wall thereof with the inlet in the forward wall and the duct from the headliner air intake provides the housing with all of the return air passing therethrough with a major portion of the air being supplied by the headliner air intake, said filters being arranged with respect to return air so that all air including outside air coming into the interior of the vehicle passes through the housing passes through the filters prior to passing through the heat exchange coil for effectively cleaning all air circulated throughout the interior of the vehicle.

5. The structure as defined in claim 4 wherein said heat exchange coil is an evaporator coil in an air conditioning system for the vehicle, said discharge means from the housing including means optionally supplying conditioned and cleaned air to slots along the base of the windshield or louvered openings in the dashboard of the vehicle to facilitate effective circulation substantially throughout the interior of the vehicle.

6. In combination with a vehicle having an enclosed space for the vehicle operator and/or passengers, a roof with a headliner spaced downwardly therefrom, a side pillar of hollow construction supporting the roof, a horizontally disposed hollow rocker panel below the doorsill and a dashboard having conditioned air discharge openings associated therewith, a housing mounted forwardly of the dashboard and including an air conditioning means with air circulating means associated therewith and communicated with the air discharge opening in the dashboard, a headliner air intake mounted generally centrally of the headliner, a laterally extending duct extending from the headliner intake above the headliner and extending downwardly through the side pillar and forwardly through the rocker panel and into communication with an air inlet in the housing in spaced relation to the air conditioning means, filter means disposed between the air conditioning means and the air inlet for requiring passage of air therethrough prior to its passing through the air conditioning means and discharged by the air circulation means into the air discharge openings associated with the dashboard.

7. The combination as defined in claim 6 wherein said filter means includes a carbon filter and a foam plastic filter with the foam plastic filter being located upstream in the airflow path in relation to the carbon filter for removing particulate material with the carbon filter removing odor and purifying the air.

8. The combination as defined in claim 7 wherein said side pillar duct and rocker panel duct are interconnected at a juncture at the lower end of the side pillar and fan means incorporated into the juncture to facilitate airflow therethrough.

9. The combination as defined in claim 7 wherein said housing includes an air inlet opening facing the filters for intake of air therethrough and being of restricted size so that a minor portion of air passes into the housing from the air inlet opening and the major portion passes into the housing from the rocker panel duct.

10. An air filtering, purifying and conditioning system for the occupant space of a vehicle comprising a plurality of air intakes located at different points within the interior of the vehicle with at least one of the air intakes being oriented adjacent the top center portion of the headliner of a vehicle, an air duct incorporated into the side pillar of the vehicle and the rocker panel of the vehicle with the air duct being in sealed communication with the air intake at the top center of the vehicle, an additional air intake communicated with ambient atmosphere, an air filtering, purifying and conditioning assembly communicated with all of the air intakes to provide air to be treated to said assembly, a discharge duct communicated with the assembly and including a plurality of air outlets for discharging air from the assembly into the interior of the occupant space of the vehicle with at least one of the outlets being located adjacent the upper area of the occupant space to provide filtered, purified and conditioned air throughout the occupant space.

11. The structure as defined in claim 10 wherein said assembly includes a housing receiving air from the air intakes, a first stage foam plastic filter, a second stage filter to remove odors, toxic gases, fumes and the like and a fan for circulating air through the filters and discharging it to the discharge duct.

12. The structure as defined claim 11 wherein said second stage filter is an activated charcoal filter.

13. The structure as defined in claim 10 wherein said air intake in the stop center of the occupant space is molded into a head liner snapped into supporting engaging with a vehicle roof.

14. The structure as defined in claim 10 wherein a portion of the air inlet duct is incorporated into the side pillar of a vehicle and a portion of the treated air outlet duct is incorporated into the side pillar of the vehicle with the inlet and outlet ducts being at opposite sides of the vehicle.

* * * * *